INVENTOR.
ARTHUR T. BRIGGS.
BY
Alden L. Redfield
ATTY.

INVENTOR.
ARTHUR T. BRIGGS.
BY
ATTY.

Patented Sept. 23, 1952

2,611,239

UNITED STATES PATENT OFFICE 2,611,239

FUEL AND COMBUSTION SUPPORTING MEDIUM CONTROL FOR TURBINE ENGINE STARTERS USING EXCESS FUEL FOR COOLING

Arthur T. Briggs, South Williamsport, Pa., assignor to Avco Manufacturing Corporation, Cincinnati, Ohio, a corporation of Delaware Application March 18, 1949, Serial No. 82,223

7 Claims. (Cl. 60—39.14)

This invention relates to prime movers and particularly to engines which are capable of producing a high starting torque under a wide variety of conditions of air temperature and barometric pressure. The invention has an especial application to the starting of aircraft propulsion units, particularly jet engines, and such a starter is hereafter described as a particular embodiment of the invention. The invention also comprises a novel method of utilizing fuel in a prime mover and of extracting therefrom kinetic energy which can be made instantaneously available as required.

When used as aircraft propulsion units, jet engines must be operable under a wide variety of conditions. An ideal starter therefor is one whose power output is uniform and unaffected by ambient conditions of temperature, pressure and humidity. Conventional starters, such as those using solid propellants or motors energized by storage batteries, are particularly and deleteriously affected by low temperatures, while starters using atmospheric air, experience a critical drop in power in the rarified air at high altitudes.

Such engines also must be revolved at comparatively high speeds to start them so that the large volume of air required to support combustion is available. This air is supplied by a compressor which will not produce an adequate supply until comparatively high rotational speeds are attained.

The requirement for instantaneously available power unaffected by ambient conditions is particularly critical at high altitudes where jet engines are susceptible to "blow-outs," or the extinguishment of combustion due to the lack of sufficient oxygen to support combustion. Under these conditions conventional starting mechanisms are unable to supply their full power to restart the jets. The design of a reliable starter producing adequate torque under these adverse conditions and of sufficiently light weight to be practical, has been a vexing problem to date in the manufacture of aircraft powered by jet engines.

It is therefore a primary object of the present invention to provide, by burning a fuel in combustion supporting medium, a readily producible and instantaneously available expansible gas for the purpose of starting a jet engine under the most adverse atmospheric conditions.

Another object is to effectively apply the forces of an expanding gas in such a manner as to perform useful work, as through a gas turbine.

A further object is to provide a system in which the temperature of combustion is effectively controlled.

A further object is to provide a system in which a controlled fuel combustion is obtained for the purpose of developing power.

A further object is the provision of a working cycle which is simple, stable, and effective, and which can be adapted to suit a wide variety of varying conditions.

A further object is to provide a prime mover which may be operated by any fuel commonly used for internal combustion engines, yet which, unlike such engines, is not sensitive to the composition of the particular fuel used.

A further object is to provide a starter that may be conveniently mounted in a wide variety of locations in an aircraft.

A further object is the provision of a system in which combustion temperatures are largely controlled by providing fuel in excess of that which can be burned with a given quantity of oxygen, and in which such excess is used for cooling rather than for combustion purposes.

A further object is to provide a prime mover which operates more, instead of less efficiently, upon increase of altitude or decrease of atmospheric pressure.

Without limiting the scope of the invention, I will briefly describe the same as involving the supply of a flow of fuel and a combustion supporting medium to a reaction chamber and the ignition of the mixture in such chamber. The amount of combustion supporting medium is maintained at a level much less than that required for complete combustion and the excess fuel is used not only to maintain the temperature of the combustion within practical limits, but also to furnish additional substances to the products of combustion which when subjected to elevated temperature will furnish an increased volume of gas for the performance of useful work.

The products of combustion and excess gaseous fuel are discharged from the reaction chamber through a nozzle arrangement to act upon suitable turbine blades. This efflux produces a thrust against the blades in order to rotate them about a shaft and the rotational movement so obtained may be applied through any desired gearing to the engine to be started.

With the above brief description in mind, and for a better understanding of the present invention reference is made to the following detailed description and accompanying drawings, in which.

Figure 1:
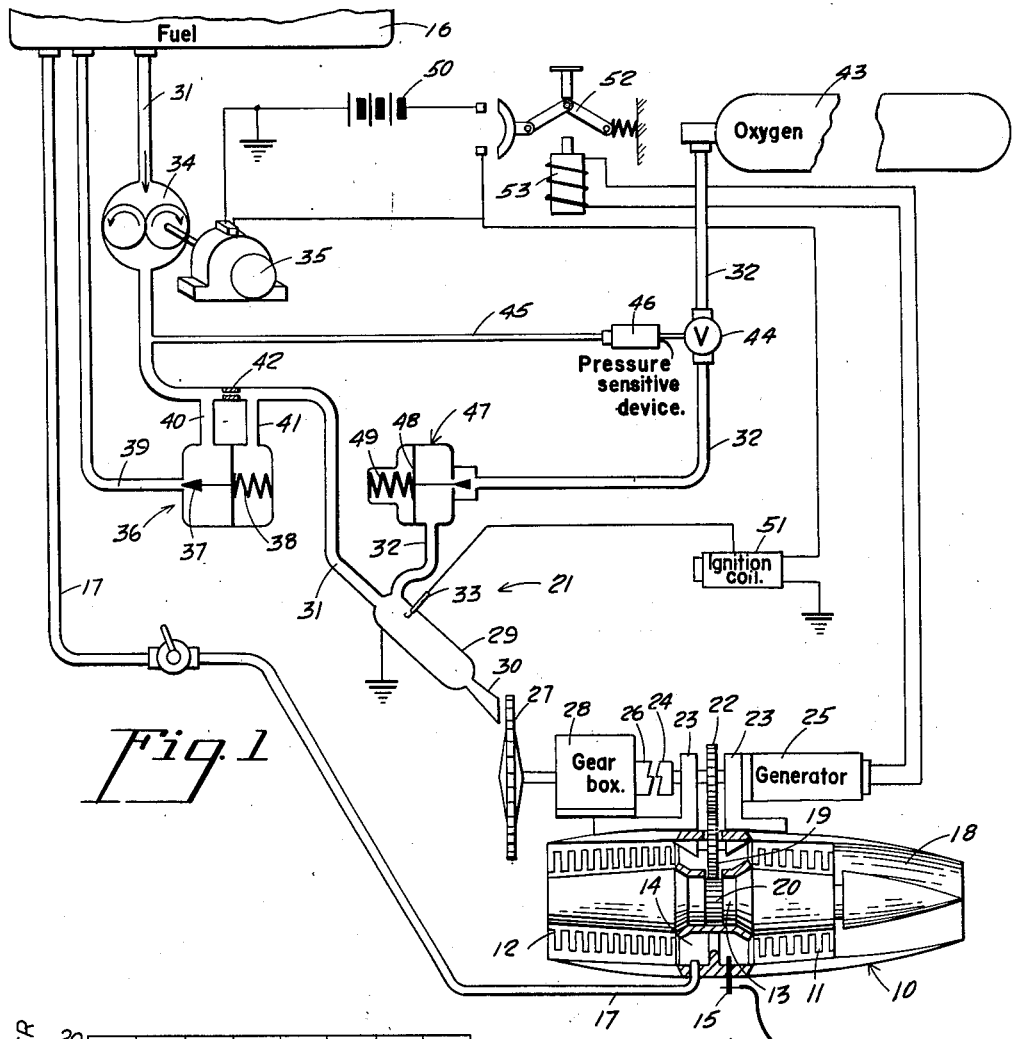
Figure 1 is a diagrammatic illustration of a system or apparatus embodying the principles of the invention.

Referring now specifically to Figure 1 of the drawing, there is shown a jet type engine 10 of conventional design comprising a gas turbine 11 and an axial compressor 12 on a common shaft 13, a combustion chamber 14 having an electric firing plug 15, a fuel tank 16 with a conduit 17 therefrom, terminating in the combustion chamber 14. The jet unit also comprises an expansion nozzle 18 for propulsion purposes.

To operate the engine, the fuel, which for practical purposes may be any of the natural or synthetic liquid hydrocarbons, is introduced into heating chamber. Air is drawn into the unit, compressed into the chamber 14, and the mixture ignited. On expansion of the mixed gases, sufficient energy is applied to the turbine 11 to drive the compressor 12, and the residuum, still capable of expansion, discharges to atmosphere as a high velocity efflux from the expansion nozzle 18.

From the operational cycle of jet engines, a high rotational speed must first be attained before the turbine of the unit can sustain its compressor load. This may be accomplished in the mechanism shown in Figure 1 by meshing an idler gear 19 with an output gear 20 formed integrally with the common shaft 13, and by operatively connecting a starter apparatus 21 according to my invention to drive the jet rotor to the required rotational speed.

An illustrative mechanism for driving the jet engine is shown in the form of an input gear 22 journalled in appropriate supports 23 mounted upon the jacket of the jet unit 10. The shaft of the input gear extends exteriorly of the supports. To one of said extending portions of the shaft there is fixed a generator 25, to be later described. Adjacent to clutch section 24 there is reciprocally journalled a mating clutch section 26 for driving purposes. The last mentioned clutch section is geared to a turbine wheel 27 through an appropriate reduction gear train housed in a gear box 28.

The power for driving the turbine wheel 27 is derived from a mixture of fuel and a combustion supporting medium ignited within a combustion chamber 29, shown diagrammatically in Figure 1. The resulting efflux of the reaction is directed through a nozzle 30 appropriately positioned for rotating the turbine wheel 27. The combustion chamber 29 has preferably a tubular contour having closed ends. Into one of these ends there is positioned a main fuel line 31 for introducing fuel to the chamber, while adjacent thereto, there is a conduit 32 for conveying a combustion supporting medium, preferably oxygen, to the chamber. The nozzle 30 has its outlet at the opposite end of the chamber. Situated intermediate the ends of the chamber there is an igniter plug 33 whose source of electric energy will be later described.

Fuel line 31 has its source at the jet engine fuel tank 16, and has a pump 34, desirably a gear pump, driven by an electric motor 35. For purposes of controlling the volume of fuel, a constant flow fuel regulator 36 is placed in the line between the pump and the combustion chamber 29. This control is of conventional design and comprises a housing, sectioned by a diaphragm into two chambers, within which there is mounted a needle plunger 37 and a spring 38 respectively. The latter urges the needle plunger to closed position with respect to a bleeder fuel line 39, the purpose of which is to convey excess fuel back into the tank 16 when the desired rate of flow is exceeded. The pressure within the chambers of the regulator is balanced by introducing the fuel through lines 40 and 41 to the chambers on either side of the diaphragm. Between the respective branches of these lines 40 and 41 the main fuel line 31 is restricted by an orifice 42, which regulates the flow of fuel delivered by the pump 34 to the chamber 29.

As previously indicated aircraft powered by jet engines must be operable at rarified altitudes, and require an adequate supply of oxygen or other gas to support combustion. If a starter is similarly dependent upon a combustion supporting gas there must be a source thereof which provides it in a ratio greater than that naturally available. To fulfill this need a commercial oxygen tank 43 is contemplated in the present invention since it not only provides a reliable source of a medium which will support combustion but also lends itself to being placed in any available space within the fuselage of the craft. There is shown in the drawing the conduit 32, preferably of flexible tubing, which joins the tank 43 to the combustion chamber 29. Means for regulating the pressure of oxygen from the tank 43 are included in the conduit 32, and include a pressure control and shut-off valve 44 which is shown as actuated by the pressure sensitive device 46. A flow control valve 47, for assuring that there will be a constant pressure of oxygen available to the combustion chamber is positioned in the conduit 32 intermediate the valve 44 and the chamber 29. This last mentioned control is of conventional design, of the manually adjustable needle valve type, and is operable through pressure exerted upon a diaphragm 48. The diaphragm in conjunction with a spring 49 maintains the regulator in open position, but when the starter system is in operation, back pressure from the combustion chamber acts to close this valve 47 and to reduce the supply of oxygen to the chamber 29 when the gas force on the diaphragm exceeds the spring force.

The clutch section 26 is arranged in known manner for longitudinal reciprocation upon the rotation of the turbine wheel 27. Conventional clutch mechanisms of this type are usually spring urged against movement in a direction to cause engagement of the mating clutch sections, and may be disengaged by removing the starting torque, or, as in the case in the present mechanism, may also be disengaged by applying a greater torque in the form of a higher rotational speed by the clutch section 24. Accordingly, the clutch sections may be disengaged either by shutting off the starter apparatus 21 or by rotating the jet engine at a greater speed than the clutch section 26.

The source of power for the electrical controls of my starter system is shown as a storage battery 50, which may be charged by a generator (not shown), an accessory of the jet engine. The battery, through appropriate wiring, operates the motor 35, provides the necessary spark for firing the mixture in the chamber 29, and may if desired, control valve 44 by replacing this pressure sensitive valve with a known commercial electrically actuated instrument. An ignition coil 51, of known design, is wired to the electrical system to provide the necessary ignition for the mixture in the combustion chamber, as by igniter plug 33.

A push button toggle switch 52 is manually operated to close the circuit to the electrical controls of the system. The switch includes means for automatically opening the circuit, thereby stopping motor 35, closing valve 44 and de-energizing the ignition circuit. The generator 25, which is keyed to the gear 22, upon reaching a predetermined starting speed by the jet engine 10, actuates a solenoid 53 and breaks the circuit at switch 52, thus shutting off the starter. Pressing the button of the switch will naturally re-energize the electric controls for re-starting the jet engine.

In operation, upon engine failure, or for an initial start, closing the terminals of the switch 52 will energize the motor 35, the ignition coil 51 and igniter plug 33, thus introducing fuel to the chamber 29 for combustion therein. The quantity of the fuel delivered to the chamber in a given interval during starting is determined, among other factors, by the area of the orifice 42, the capacity of the pump and the sensitivity and adjustment of the regulator 36. The adjustment of these last mentioned elements classifies each starter installation as to output potential. Pressure in the main fuel line 31 opens the valve 44 for delivering oxygen from tank 43 to the chamber 29. The oxygen is supplied to the chamber at substantially constant pressure by the valve 47, flow being established by the pressure drop between this valve and the combustion chamber.

In analyzing the operation of my system it should be remembered that the combustion of hydrocarbon fuels in either air or oxygen at stoichiometric mixtures results in temperatures much too high to be utilized in any but specially designed turbines. In ordinary practice the end temperature is reduced by using a large excess of air. To the contrary the present invention conceives an adjustment of the controls to supply a volume of fuel in excess of the amount required for complete combustion. It is to be noted that the excess of fuel is subject to temperatures of the order of 1000 degrees to 2500 degrees Rankine, and is probably subject to cracking or other chemical changes, the exact nature of which is not at present fully understood. It is reasonably clear, however, that such changes as do occur produce gases, the volume of which will be multiplied substantially over the volume which can be obtained by simple vaporization, and such increase in volume provides a definite source of energy capable of being utilized in the performance of useful work.

The use of a large excess of fuel in comparison to the volume of oxygen supplied would generally be uneconomical but in the present invention it is put to advantage under conditions where there is a large supply of available fuel and a short period during which the starter is required to perform work. Experiments have shown that 6 starts of 50 peak horsepower of 30 second duration may be accomplished with a combustion chamber having general dimensions of 1 inch diameter and a length of 10 inches, using the standard commercial tank of oxygen at 2000 p. s. i.

Although the use of atmospheric air as a combustion medium may be utilized particularly where the engine is started at an air base, it is preferable to use oxygen, which of course is extremely active. The products of the combustion in the chamber 29 discharge to atmosphere as a high-velocity efflux from the nozzle 30 and impinge upon the blades of the turbine wheel 27. This effluence drives the wheel, which transmits through the appropriate reduction gears and clutch sections 26 and 24, a driving torque to the jet engine 10.

The torque of the turbine wheel 27 is kept relatively constant by maintaining a nearly uniform combustion temperature within the chamber 29. To this end, pump 34, regulator 36 and orifice 42 assure a constant flow of fuel independent of the back pressure within the reaction chamber, while the oxygen flow is regulated in response to the chamber pressure. An increase in temperature within chamber 29 tends to increase the pressure therewithin. This increased pressure operates through valve 47 to shut off the oxygen supply and thus reduce combustion. There is therefore a very strong tendency of the apparatus to maintain uniform pressure, temperature, and flow through the reaction chamber, and the flow through nozzle 30 is maintained substantially constant. The pump 34, regulator 36 and orifice 42 may be replaced by a reliable metering pump.

Figure 2:
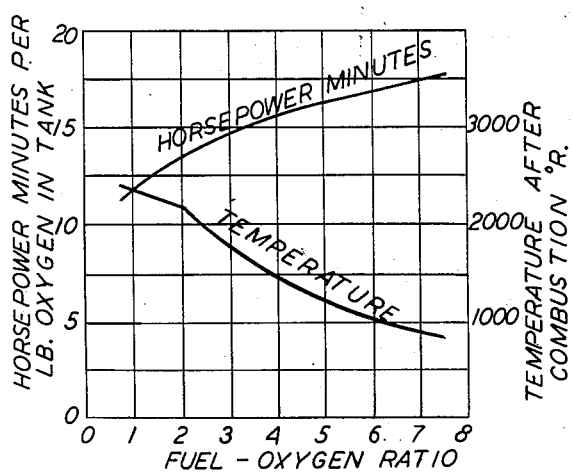
Figure 2 is a chart showing how the fuel to oxygen ratio, by weight (octane being an exemplary fuel chosen for the purpose of this chart), may be varied to produce different output power measured in horsepower minutes per pound of supplied oxygen.

The temperatures after combustion and the horsepower available for useful work have been calculated for various fuel-oxygen ratios and appear in chart form in Figure 2. The temperatures are based on adiabatic combustion at constant pressure. It will be noted that as the fuel to oxygen ratio is increased the temperature of combustion decreases, thus showing the cooling effect of excess fuel.

The power output is expressed in horsepower minutes at the starter turbine shaft for each pound of oxygen in the oxygen tank, and includes the losses due to a 50% turbine efficiency and the residual oxygen left in the tank after the original pressure of 2000 p. s. i. Abs. has dropped to a combustion chamber pressure of 350 p. s. i., the pressure used in determining this chart.

Figure 4:
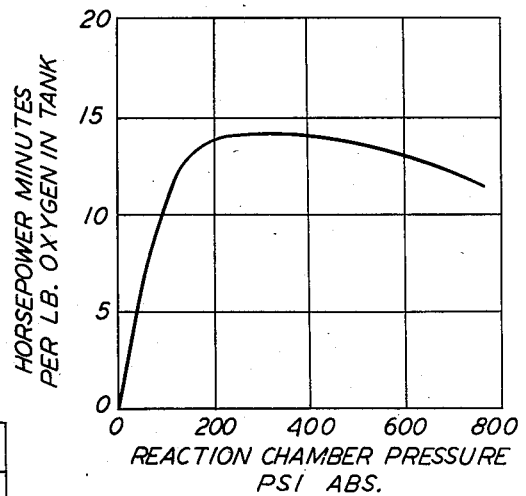
Figure 4 is a chart which illustrates how the selection of the reaction chamber pressure affects output expressed in horsepower minutes per pound of oxygen in the tank.

Although reasonably high pressures are necessary to realize the greatest advantage from a mechanism of the present type, these are not critical as is shown by Figure 4, which indicates how the output of the starter apparatus 21 expressed in horsepower minutes per pound of oxygen consumed varies with the pressure generated within the chamber 29.

Figure 5:
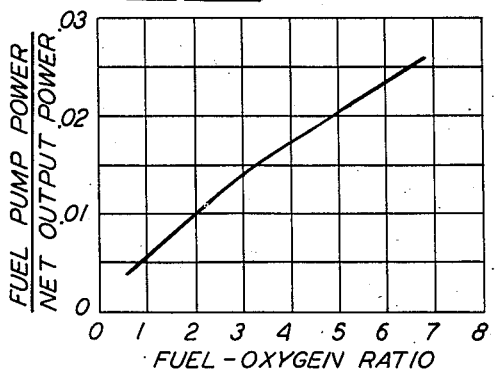
Figure 5 is a chart showing the relationship between the ratio of fuel pump power to net output power, and the fuel to oxygen ratio as the latter is varied.

The power required to introduce the fuel for consumption against the reaction pressure in the chamber 29 is but a fraction of the starter output, as may be seen from the curve of Figure 5. This chart shows the ratio of pumping power to output power for various fuel oxygen ratios where the reaction chamber pressure is 350 p. s. i. Abs. It will be seen that little power is required to operate the pump and that the performance of apparatus constructed according to the invention compares very favorably with conventional starters.

Figure 3:
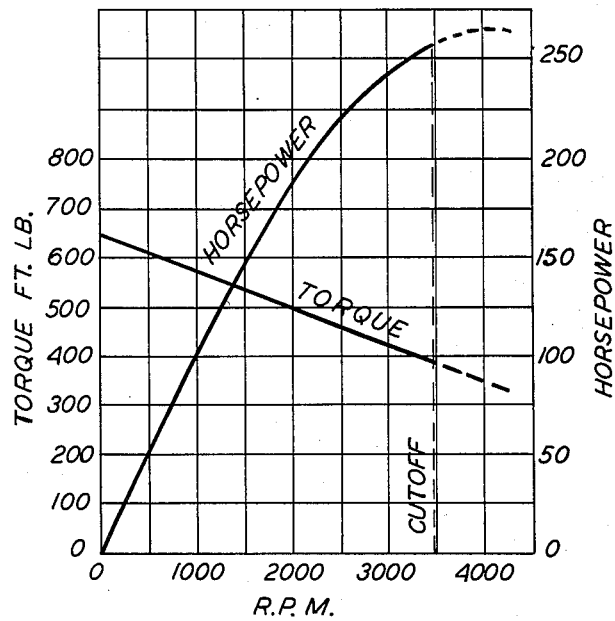
Figure 3 is a chart showing how the torque and horsepower produced by a device constructed in accordance with the invention, vary with the rotational speed thereof.

The performance of an experimental device constructed in accordance with the teaching of the present invention is graphically shown by the chart of Figure 3, which illustrates the effectiveness of the apparatus as a starting mechanism for a jet engine. It will be immediately apparent that the starter produces high torque instantly, with a gradual falling off as R. P. M. increases. Horsepower is zero at the start but increases somewhat linearly as R. P. M. increases until the maximum horsepower is reached.

Using a standard oxygen tank as above identified a starter constructed according to the present invention may be made to deliver 100 horsepower for three (3) minutes. The power may of course be used in smaller or larger increments such as fifty (50) horsepower for six (6) minutes or three hundred (300) horsepower for one (1) minute. The starting engine including the controls and fuel pump, weighs about one hundred (100) pounds and the oxygen tank one hundred and sixty (160) pounds when fully charged. Consumption of fuel is about thirty-eight (38) pounds during the time the starter is performing work.

It will be noted that my invention provides an automatic system by which power may be effectively applied by simply pressing a starter button so that the combined instrumentalities may proceed to carry out their designated function. It is apparent from the description that the inventive concept is not to be limited to the particular details described, since these may be modified within the scope of the appended claims without departing from the spirit and scope of the invention.

What is claimed is:

1. In a thermal jet starter for internal combustion engines having a source of fuel supply, the combination of a combustion chamber having a discharge nozzle and ignition means, a supply of oxygen under pressure, a pressure control valve for regulating the oxygen to a constant pressure, a flow control valve in communication with said combustion chamber and said pressure control valve for controlling the flow of oxygen to said combustion chamber, a pump in communication with said fuel supply for delivering fuel into the chamber at a uniform rate of flow in excess of that necessary for the complete combustion of said oxygen, said oxygen flow control valve regulating the flow of oxygen in response to combustion chamber pressure in quantities sufficient when combined with said fuel to maintain the pressure within said chamber constant, means sensitive to fuel pump pressure for permitting flow of oxygen from said supply to said chamber, a power source for said fuel pump, a source of electric current in circuit with said pump power source and ignition means, a switch interposed in said circuit, a turbine rotatable by combustion efflux from said nozzle, speed responsive means for moving said turbine into and out of drive engagement with the engine to be started, said means including a drive engagement element, a reduction gear train between said turbine and drive element, a driven element, and power transmission gears between said driven element and engine, and means responsive to engine starting for breaking the electric circuit.

2. In combination with an internal combustion engine having a source of fuel supply, a thermal jet starter comprising a combustion chamber having a discharge nozzle and ignitor, ignition means for said ignitor, a supply of oxygen under pressure, a pressure control valve for regulating the oxygen to a constant pressure, a flow control valve responsive to combustion chamber pressure for controlling the flow of oxygen from said pressure control valve to said chamber, a pump in communication with said engine fuel supply and adapted to deliver fuel into the chamber at a uniform rate of flow in excess of that necessary for complete combustion with the oxygen, motive means for said pump, a device sensitive to fuel pump pressures for permitting flow of oxygen from said supply to said chamber, means for simultaneously energizing said motive means and ignition means, a turbine rotatable by the efflux from said nozzle, and speed responsive means for moving said turbine into and out of engagement with said engine.

3. In an engine starter, the combination comprising; a combustion chamber formed to define a discharge nozzle; a turbine; clutching means for engaging and disengaging said turbine and the engine to be started; a source of fuel under pressure; a source of combustion supporting medium under pressure independent of said turbine; a fuel conduit connected to said fuel source and said combustion chamber; means in said conduit for metering fuel to said combustion chamber at a uniform rate of flow; means independent of said fuel conduit responsive to the pressure within said combustion chamber for metering combustion supporting medium into said chamber, said last named metering means admitting combustion supporting medium to said chamber in quantities substantially less than necessary for complete combustion of the fuel whereby vaporization and decomposition of fuel occurs within said combustion chamber; and ignition means within said chamber for igniting the fuel and combustion supporting medium whereby gaseous products under pressure are formed within said chamber and ejected from said nozzle to drive said turbine.

4. In a starter mechanism including a starter motor driven by combustion products for starting an engine, the combination comprising; a combustion chamber; ignition means within said chamber; means independent of the starter motor for introducing a combustion supporting medium under pressure into said chamber; a flow regulator including a metering orifice for introducing fuel into said chamber at a uniform rate of flow substantially in excess of that required for complete combustion with said combustion supporting medium and sufficient to cause decomposition of the fuel into volumes of gaseous products substantially in excess of those produced by complete utilization of the combustion supporting medium; and a flow control valve having a movable control element responsive to the pressure within said chamber for regulating the pressure therein to a substantially constant value by controlling the flow of combustion supporting medium into said chamber to a value such that, when ignited with the fuel entering said chamber, gaseous products are formed sufficient to maintain the pressure at a constant value.

5. In an engine starter of the type including a combustion chamber in which is formed products of combustion and a starter motor driven by the products of combustion, the combination comprising a fuel supply under pressure, a supply of combustion supporting medium under pressure independent of the starter motor, a flow regulator including a metering orifice for introducing fuel from said supply into the combustion chamber at a uniform rate of flow, a flow control valve having a movable metering element responsive to chamber pressure for regulating the flow of combustion supporting medium from said supply to said chamber, said flow control valve regulating the flow of combustion supporting medium at all times at values grossly insufficient for complete combustion of said fuel, the ratio of fuel and combustion supporting medium metered being such that the products formed within the combustion chamber comprise vaporized and decomposed fuel products as well as combustion products and maintain a constant pressure therein at all times.

6. In combination in an engine starter for starting a jet engine, a combustion chamber formed to define a nozzle, a source of fuel under pressure, a tank of combustion supporting medium under pressure, a conduit communicating with said fuel source and said combustion chamber, flow regulating means including a metering restriction in said conduit to regulate to a constant value the rate of flow of fuel to said chamber, a conduit communicating with said tank of combustion supporting medium and said combustion chamber, a flow control valve in said last named conduit for regulating the flow of combustion supporting medium to said chamber, said flow control valve having a movable metering element the movements of which are responsive to the pressure within said combustion chamber, the combustion supporting medium supplied to said combustion chamber by said flow control valve being grossly insufficient for the complete combustion of the fuel supplied to said combustion chamber at all times whereby vaporized and decomposed fuel products as well as combustion products are formed, ignition means within said combustion chamber for igniting the fuel and combustion supporting medium supplied thereto whereby gaseous products are formed and ejected from said nozzle, a turbine against which the products from said nozzle impinge, and means interconnecting said turbine and the jet engine to be started.

7. In an engine starter including a combustion chamber, discharge nozzle and ignition means, a supply of combustion supporting medium, a supply of engine fuel, a main fuel line connecting said supply with the combustion chamber, a pump in said line, a restriction in said line intermediate the pump and combustion chamber, a constant flow fuel regulator comprising a closed interior, a diaphragm dividing said interior, a bleeder line in communication with said fuel supply and one side of said regulator interior, a needle plunger mounted to one side of said diaphragm and in spring urged closed position in respect to said bleeder line, a fuel line joining the plunger containing side of the regulator to the main fuel line between said pump and restriction, a fuel line joining the remaining side of the regulator to the main fuel line between said restriction and combustion chamber, a conduit joining the supply of combustion supporting medium to said combustion chamber, a flow control valve interposed in the conduit, said valve comprising means responsive to pressure within the combustion chamber for regulating the ratio of fuel to combustion supporting medium, a turbine rotatable by the efflux from said nozzle and speed responsive means for moving said turbine into and out of drive engagement with said engine.

ARTHUR T. BRIGGS.

REFERENCES CITED

The following references are of record in the file of this patent:

UNITED STATES PATENTS

| Number | Name | Date |
|---|---|---|
| 1,052,588 | Janicki | Feb. 11, 1913 |
| 2,154,572 | Lansing | Apr. 18, 1939 |
| 2,392,565 | Anderson et al. | Jan. 8, 1946 |
| 2,442,954 | Lee | June 8, 1948 |
| 2,511,385 | Udale | June 13, 1950 |
| 2,531,761 | Zucrow | Nov. 28, 1950 |

FOREIGN PATENTS

| Number | Country | Date |
|---|---|---|
| 616,695 | Great Britain | Jan. 26, 1949 |